Patented Nov. 6, 1934

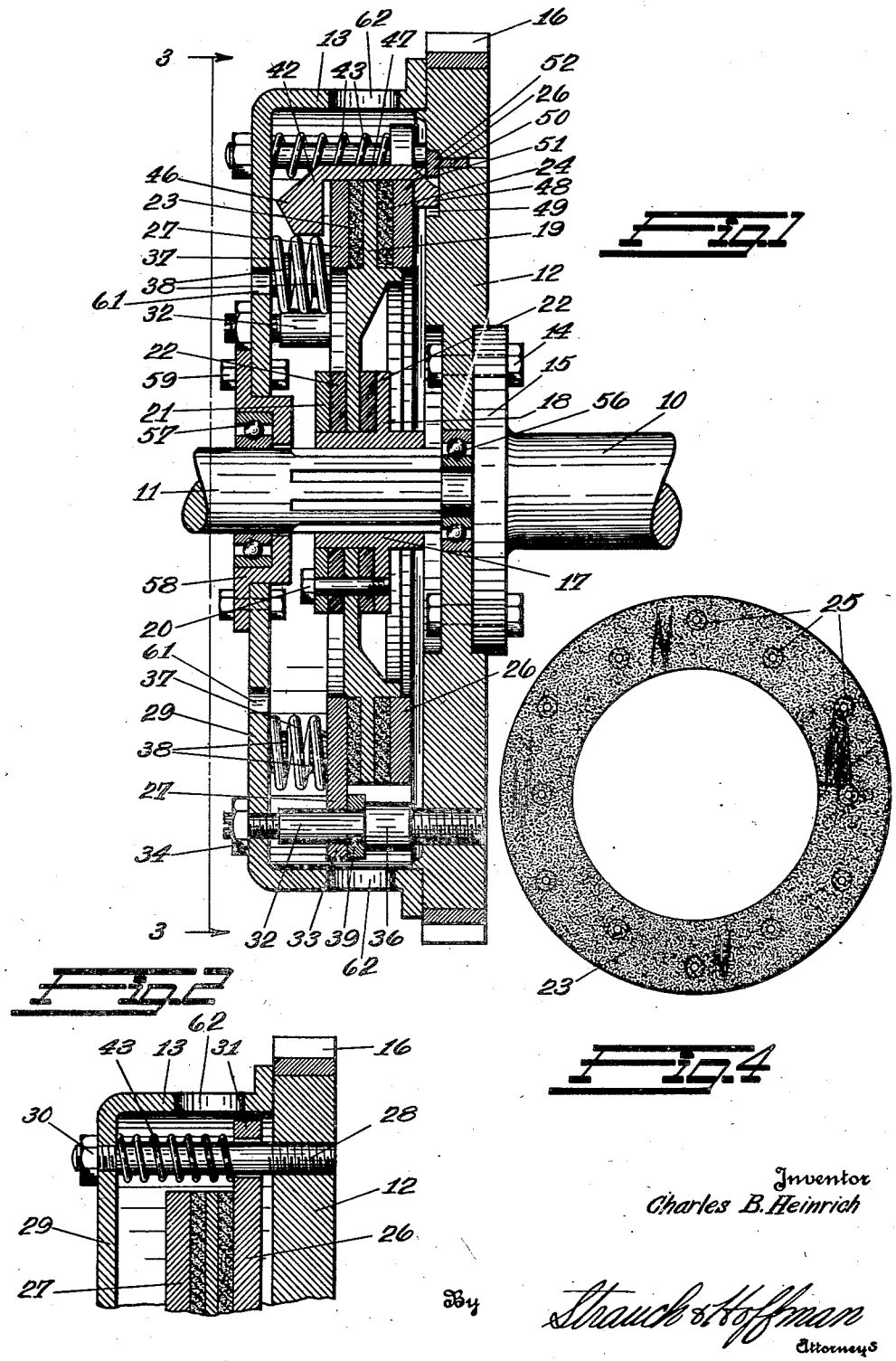

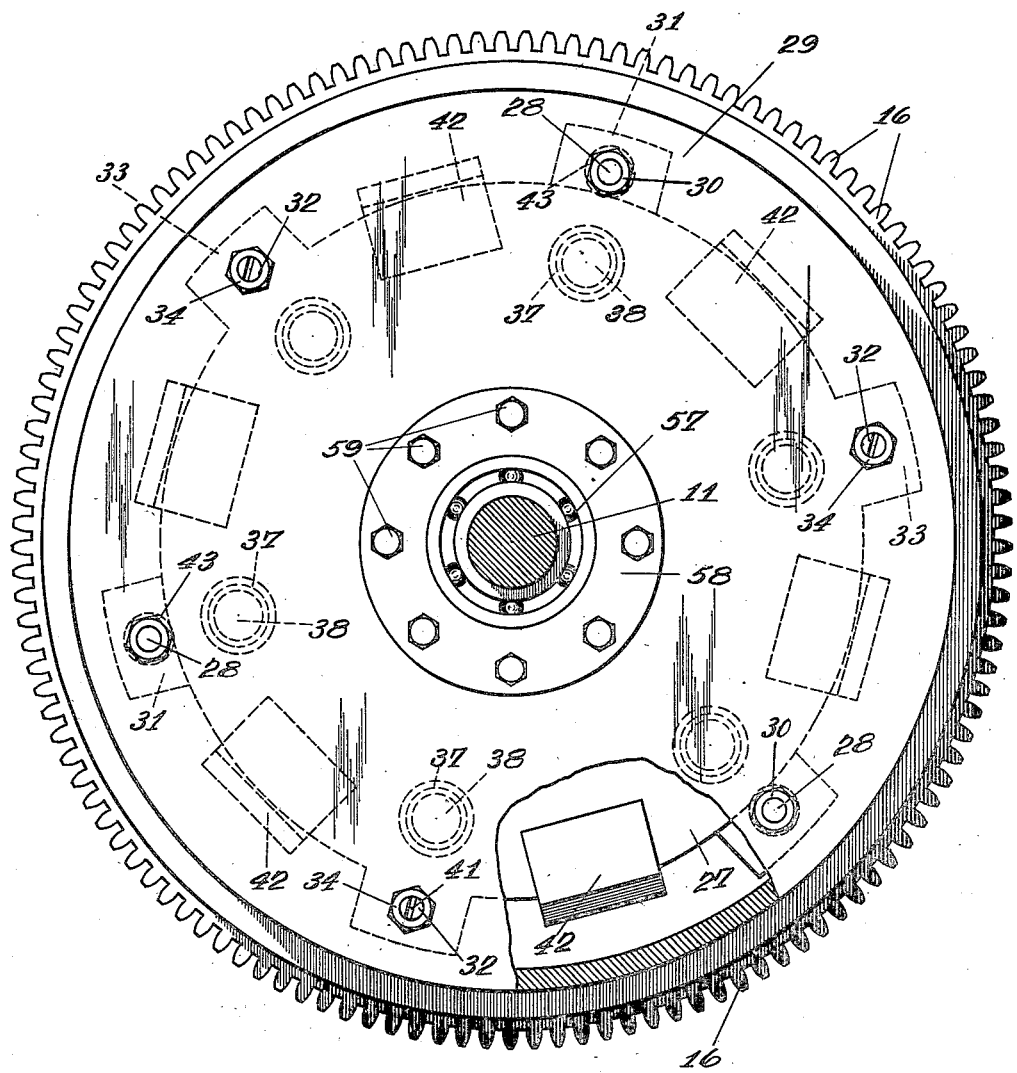

1,979,880

UNITED STATES PATENT OFFICE 1,979,880

AUTOMATIC CLUTCH

Charles B. Heinrich, Maple Shade, N. J., assignor to Automatic Drive and Transmission Company, Gloucester City, N. J., a corporation of New Jersey Application December 10, 1931, Serial No. 580,172

7 Claims. (Cl. 192—105)

This invention relates to automatic clutches, of the type in which slippage (substantial, when necessary) of the clutch elements is permitted whenever the speed of the drive and driven shafts is such that the power plant is incapable of handling the load with full clutch engagement. The invention is particularly intended for use in road or similar vehicles propelled by an internal combustion engine though it is capable of wide further use.

In automatic clutches heretofore proposed in which substantial slipping was permitted during the application of the driving torque to the vehicle, great difficulty has been experienced in providing a clutch construction which would successfully withstand the relatively severe usage to which such clutches are subjected at times and still maintain uniform characteristics throughout the life of the clutch. It has been found that automatic clutches constructed of materials, generally used in the manufacture of manually operated clutches, and subjected to pressures of the same order as those to which the manually operated clutches are subjected, do not operate satisfactorily in automatic arrangements, due to excessive wear, scarring and the like which limits the life of the clutch to at most a few thousand miles, and because as the temperatures of the clutch elements rise, when slippage is necessary as is contemplated in automatic clutches, the characteristics of the clutch change and the smooth and even application of the power of the drive shaft to the driven shaft cannot be effected. Either excessive or undesired slipping results, or the clutch exhibits a tendency to suddenly fixedly grip the drive and driven shaft in non-slipping cooperation, resulting in chatter and the placing of heavy strains upon the drive mechanism of the vehicle as well as upon the clutch.

Numerous kinds of clutch material have been tried in an effort to develop an automatic clutch that would give a smooth and even transmission of power from the drive to the driven shaft, while permitting slippage between the drive and driven shaft as the load is being picked up by the power plant, and varying pressures and lubricating methods have been experimented with with the view of giving such smooth and even application of the power, and at the same time provide the desired non-slipping engagement between the clutch elements, when the power plant is operating at a speed at which it delivers sufficient torque to overcome the load incident to the movement of the vehicle upon grades, or due to acceleration, or simply to overcoming the resistance to the movement of the parts thereof. It has been found, if the clutch materials are properly selected and combined, the clutch elements properly designed and associated, the automatically applied clutch pressures properly selected and controlled, that an automatic clutch can be provided that has a life equal to, or greater than, the life of an ordinary manually operating clutch such as are now in wide use in motor driven vehicles and in similar relations.

In the selection of automatic clutch material, particularly the facings, it has been found to be of great importance to utilize material that contains evenly distributed heat resisting lubricant so that it will not cut or wear under extreme slippage. This will result in a material that has a coefficient of friction that is substantially lower than that which characterizes clutches of the manual type, and therefore it will be necessary to rely upon pressures, to cause the clutch elements to finally frictionally grip each other without slippage, that are substantially in excess of the pressures relied upon in manually operated clutches to attain the same result. The preferred materials are those having very low coefficients of friction at low engaging pressures with uniformly increasing coefficients as the pressures increase, so that at low engaging pressures and during intermittent engagement loss of energy and generation of heat is minimized, and at higher pressures and speeds slippage is eliminated.

The desired lubrication and preferred coefficient characteristics I have found can be obtained by incorporation of a lubricant preferably in solid form, in the clutch elements in such manner that the lubricant is disseminated evenly throughout the elements so that irrespective of the extent of wear or usage, the operating characteristics given to the clutch by the lubricant will remain substantially constant. The desired low wear is also assured by providing clutch elements that present hard and relatively smooth bearing surfaces to each other. The smoothness and desired uniform variation of coefficient as the pressures vary may be provided, it is found, by utilizing a large quantity of graphite or similar material, in combination with fibrous material and a binder, so that the smoothness of the non-metallic element is increased at the same time that its self-lubricating properties are enhanced. Clutch elements, thus produced, exhibit substantially uniform characteristics under varying conditions of service, irrespective of normal temperature changes, and permit varied degrees of smooth slipping without injury, when the automatically applied pressures are less than or slightly greater than ordinary or normal clutch pressures, and, at the same time, serve to provide a certain non-slipping connection between the clutch elements when the automatically applied pressures sufficiently exceed normal clutch pressures now used in manually controlled clutches.

The primary object of this invention accordingly is to provide an automatic clutch so constructed as to successfully and smoothly transmit the power of the drive shaft to the driven shaft, permitting the even slipping of the clutch elements as the speed of the drive and driven shafts increases, which, when the speed of said shaft has reached a point at which it can effectively handle the load to which the driven shaft is subjected, causes the clutch elements to be fixedly held in relation to each other frictionally, and in which the life of the clutch is at least commensurate with the life of manually operative clutches now in wide use.

Another object of the invention is to provide an automatic clutch, including clutch elements between which facings are provided that present hard and smooth surfaces, which facings are constructed of a composition, including a solid lubricant disseminated throughout the material so that the same relative percentage of lubricant is present in said facings no matter to what extent said facings may be worn.

This invention also aims to provide an automatic clutch designed to operate under pressures that are automatically applied to a degree substantially greater than the pressures to which the ordinary clutches are subjected, that will permit smooth slippage between the clutch element at pressures less than or slightly greater than the pressures, to which ordinary clutches are now subjected, but that will provide the desired non-slipping frictional engagement between the elements when said elements are automatically subjected to pressures substantially exceeding normal clutch pressures.

A further object of the invention is to provide a clutch facing for an automatic clutch designed to permit slipping until the engine shaft and driven shaft reach the proper speed, and presenting a hard and smooth lubricated surface having a long life and capable of smoothly picking up the load and at the same time frictionally holding the clutch elements in a non-slipping engagement when the clutch should be engaged.

Another object of the invention is to provide a unitary driven member the opposite sides of which contact with clutch plates carried by the drive element through clutch facings, embodying a solid lubricant or the like evenly distributed through the facings which are formed so as to present hard and relatively smooth clutch surfaces.

Still another object of the invention is to provide a unitary driven member disposed between clutch plates, which member and plates are movable as a unit against a resilient support and to interpose between said member and plates lubricated clutch facings having a hard surface and low coefficient of friction, so that, when the member and plates are automatically forced into contact with each other the resilient support insures an even distribution of the applied pressure to the facings resulting in a smooth operating clutch under slipping conditions, and a firm non-slipping engagement when the clutch is engaged with the maximum of applied pressure.

A still further object of the invention is to provide a novel non-metallic clutch facing for automatic clutches designed to permit slipping until the speed of the engine and load increases sufficiently, so that the load in an automotive vehicle can generally be accelerated in starting without shifting of the transmission gears ordinarily provided.

This invention also aims to provide a clutch facing for a slipping clutch, including a solid heat resisting lubricant evenly distributed throughout the mixture of heat resisting fibrous material and a binder, in which the lubricant is present in the mixture to a sufficient extent to provide a facing that has a low coefficient of friction that improves smoothness of operation and long wearing qualities.

Still another object of the invention is to provide a slipping clutch facing including approximately twenty percent or more of graphitic material or the like evenly distributed throughout the original mixture or mass of material from which the facing is formed.

Another object of the invention is to provide an automatic clutch utilizing facing material that has the characteristic of presenting a varying coefficient of friction under the varying pressures to which the facing is subjected, i. e., in which the coefficient of friction increases as the pressures increase so that the coefficient is lowest when maximum slippage is intended to occur and highest when it is intended that no slipping between the clutch elements should occur.

Further objects of the invention will appear as a description thereof proceeds with reference to the accompanying drawings in which:

Figure 1 is a longitudinal section through an automatic clutch embodying the present invention.

Figure 2 is a detail sectional view of the form of invention shown in Figure 1.

Figure 3 is a transverse sectional view of the clutch on the plane indicated by the line 3—3 looking in the direction of the arrows.

Figure 4 is a detail face view of a preferred form of clutch facing.

Like reference characters indicate like parts through the several figures.

Referring to the drawings, one form only of the present invention is illustrated, though it should be understood that the invention may be embodied in clutches of differing structural characteristics. The illustrated form consists generally of an automatic clutch interposed between a driving shaft 10 and a driven shaft 11 whereby motion is transmitted from one shaft to the other through the mechanism of the present invention. In an automotive vehicle the driving shaft 10 would be the crankshaft of an internal combustion engine, and the driven shaft 11 would generally transmit motion to a variable speed transmission, not illustrated because it may be of any construction suitable for the purpose. Inasmuch as the clutch is designed to permit slipping until the torque of the engine increases sufficiently to carry the load with full clutch engagement the transmission may in practice include a lesser number of gear changes, thus reducing the cost of this unit.

For transmitting the motion of the driving shaft 10 to the driven shaft 11, the clutch unit, that is employed, consists of an automatically operable device wherein the clutching effort bears a definite relation to the speed of said driving shaft. In the form of the invention, here used by way of example, this clutching device comprises a fly-wheel disc 12 and housing 13 attached thereto forming the fly-wheel structure secured by bolts 14 to a flange 15 fast to the driving shaft 10. The fly-wheel disc 12 either has a gear 16 for self-starting purposes cut on its periphery or has a steel gear shrunk on in the same locations. As shown on Figure 1 driven shaft 11 carries a hub 17 mounted thereon in splined relation, so that it can move axially and relative to the shaft 11. Said hub is formed with a circumferential flange 18 serving as a backing plate against which a clutch plate 19 is rigidly held by bolts 20 passing through a clamping ring 21. Preferably gaskets 22 are interposed respectively between the sides of the plate 19 and the flange 18 and ring 21. The clutch plate 19 is circumferentially recessed at opposite sides to respectively seat annular discs, of facing material, 23 and 24 formed of wear resisting friction material and provided with suitable openings 25 for attachment to said plate, as by rivets or the like. The clutch plate 19 and facings 23 and 24 form an assembly called the driven member arranged respectively juxtaposed to a movable automatic driving plate 26 and a positive driving plate 27. Thus the driven plate lies between the automatic drive plate 26 and positive drive plate 27 and hence movement of the automatic drive plate 26 towards the positive drive plate 27 causes the desired frictional clutching through the discs or facings 23 and 24 to transmit motion from the drive shaft 10 to the driven shaft 11.

The discs of facing material 23 and 24 illustrated in detail in Figure 4, constitute an essential and important part of the present invention, since automatic clutches heretofore proposed in which slipping was permitted, have exhibited a tendency, when facing material of usual form, having a relatively high coefficient of friction and having no permanent heat resisting lubrication, was used, to wear out very rapidly, to chatter or squeal depending upon the temperature and to provide a rough and uneven transfer of the power of the drive to the driven shaft. The permanently lubricated facing material of the present invention gives to an automatic clutch a length of life even with excessive slippage caused by improper handling that is at least commensurate with that of manually operated friction clutches, and insures smooth load pickup under all conditions due to the novel characteristics of low coefficient of friction that increase in value as the applied pressure increases. Such material has the further characteristics of presenting a relatively hard smooth surface that glazes or polishes in use, and of having a lubricant evenly distributed throughout the material from which the facings are formed, which lubricant is utilized in such quantity as to give the facing the essential hard smoothness as well as the desired low but increasing coefficient of friction as the pressures increase when the facing is put into use.

Preferably, the improved facing consists of fibrous material, a binder, and the solid lubricant just referred to, all of which are heat resisting. The fibrous material, that is preferred is asbestos. The binder may be any asphaltic, bakelite, or similar binding material used in the manufacture of automotive clutch facings, while the solid lubricant preferred is graphite or the like.

The facing may be formed from an intimate and uniform mixture of the materials just referred to, in which the graphite is evenly distributed in finely divided form, by molding or by forming the material into sheets and stamping or punching the facing discs therefrom, or in any other manner. The material, during its treatment, may be subjected to relatively high heat and pressure to produce a compacted disc of the desired hardness and smoothness and possessing the characteristic of presenting a low and varying coefficient of friction that increases under increased pressure.

It has been found that facings constructed in accordance with the above and including at least approximately twenty per cent and preferably forty to sixty per cent or more by weight of a solid lubricant, such as graphite or the like, evenly disseminated throughout the mixture from which the facings are formed gives a clutch lining that possesses all of the desirable characteristics above stated.

Suitable linings including a solid lubricant to the degree stated present coefficients of friction, that, it has been found, vary with the increase of applied pressure. This is extremely desirable in automatic slipping clutches, since at the lower pressures substantial smooth slipping is desired, which slipping should diminish as the speeds of the drive and driven shafts increase and finally cease entirely as said speed reaches a predetermined value. The initially very low coefficient of friction enables the clutch to gradually and smoothly pick up the load. As the speeds of the drive and driven shafts increase the pressure increases, as hereinafter pointed out, and at the same time the coefficient of friction increases, both factors contributing to the diminution in the degree of slippage as the speed of the drive shaft increases. As said speed increases still further both factors contribute to bring the clutch to a non-slipping condition without jar and without injury or excessive heating of the clutch elements.

The material just described, it has been found, makes it possible to use facings having a relatively large area without introducing undesired slipping at normal speed of the drive shaft, so that the wear on the facing due to the desired slipping is minimized because of the large area presented and the effective lubrication secured during slipping. For light road vehicles, such as the Ford car or the like, it has been found, that clutch facings of annular form constructed of the above materials, having an area of approximately 60 square inches give excellent results. For such light vehicles, an annulus bounded by an outer circle 10½ inches in diameter and an inside diameter of 5⅝ inches has been found highly satisfactory. The facing is preferably approximately one eighth of an inch thick, though this may be varied as desired. The size of the facings, their form and their area may be varied in accordance with the power to be transmitted and to meet the space requirements of the vehicle or the like to which the facing is applied, though the flat annular form is preferred because it presents a bearing area that may be disposed some distance from the axis of the drive shaft in a plane at right angles to said shaft. This arrangement is effective to smoothly transmit the torque in avoiding the use of rounded or wedge shaped contacting surfaces, which may become deformed in use thus providing only partial contact between the clutch elements resulting in improper functioning of the clutch and undesired slipping when the drive shaft has reached full speed.

Tests of specimens of the above material in a

Bendix button tester at a speed of 1750 revolutions per minute for the coefficient of friction of various mixtures including more or less solid lubricant, shows that the material possessing the above stated desirable characteristics has the following coefficient of friction under varying pressures.

*Coefficients of friction*

| Pounds per square inch applied—pressure | 20% graphite | 30% graphite | 40% graphite | 50% graphite | 60% graphite |
|---|---|---|---|---|---|
| 25 | .155 | .145 | .127 | .112 | .067 |
| 50 | .204 | .186 | .149 | .149 | .118 |
| 75 | .262 | .184 | .210 | .179 | .132 |
| 100 | .270 | .209 | .218 | .192 | .146 |
| 125 | .308 | .206 | .217 | .196 | .170 |
| 150 | .283 | .171 | .211 | .187 | .166 |

The percentages of graphite are figured on the amount of lubricant in the original mix. During the process of treatment under heat and pressure the relative percentages change.

For comparison with facings manufactured of the same material combined in different proportions, and including smaller amounts of graphite which material it has been found does not possess all of the desirable characteristics above described, the following table of coefficients of friction is given:—

*Coefficients of friction*

| Pounds per square inch applied—pressure | 0% graphite | 5% graphite | 10% graphite |
|---|---|---|---|
| 25 | .249 | .282 | .172 |
| 50 | .277 | .339 | .436 |
| 75 | .289 | .362 | .270 |
| 100 | .266 | .366 | .330 |
| 125 | .256 | .347 | .328 |
| 150 | .259 | .355 | .340 |

It will be observed from the above that the coefficient of friction is lower in the material of the preferred form embodying forty to sixty percent of graphite, and that it increases relatively evenly with the application of pressure as above pointed out to a maximum that is reached after the application of more than 100 pounds pressure per square inch, and that beyond this point the coefficient does not vary, substantially. This is very desirable in automatically operating clutches, since sudden and irregular changes in the coefficient of friction as the pressure varies, such as characterize materials having less than approximately twenty percent lubricant are to be avoided, since such changes cause uneven or rough transmission of the power.

For transmitting the rotary motion of the flywheel disc 12 to the automatic plate 26, studs 28 are threaded into the disc 12 at equally spaced intervals, and in the present instance are shown having their outer ends passing through the housing end or cover plate 29 which is thus clamped in place over the open end of the housing 13 by nuts 30. The automatic plate 26 is also provided with apertured ears 31 for the passage of these respective studs 28 and just enough clearance is provided for free sliding movement of the plate 26 axially along these studs 28.

For transmitting the rotary motion of the flywheel disc 12 to the positive plate 27, axially adjustable posts or studs 32 are threaded into the fly-wheel disc 12 at equal distances apart passing through ears 33 on positive plate 27 and projecting through the cover plate 29 to receive nuts 34. These posts 32 are radially located beyond the periphery of the driven plate 19, 23 and 24 so as not to interfere with its operation. Each post 32 at the same distance from an end is provided with a shoulder 36 which serves as an abutment and limit stop for the positive plate 27, which is held against the shoulder 36, by pressure springs 37 to resist the clutching pressure of the plate 26. These springs 37 are held under compression between the positive plate 27 and the cover plate 29 and are prevented from springing out of position by studs 38 projecting respectively from the faces of the two plates 27 and 29. Preferably, washers 39 are interposed between the positive plate 27 and the respective shoulders 36. In connection with the posts 32, it should be noted that the initial setting of the positive plate 27 is made so as to leave a clearance between the automatic, positive and driven plates, so that the clutch is disengaged when the drive shaft is turning at a low or idling speed. To readily turn the posts 32 to make this adjustment, the projecting end of each is provided with a screw driver slot as shown at 41 (Figure 3) to facilitate adjustment and locked by nut 34. Thus in adjusted position, the positive plate 27 is held spring pressed against the post shoulders 36 and in such close proximity to the face of the disc 24 that a relatively slight linear movement of the latter will cause frictional contact between the drive and driven plates.

For the purpose of automatically shifting the automatic plate 26 to produce a frictional gripping which increases as the speed of the driving shaft 10 increases, a plurality of centrifugally operated weights 42 are provided, six being here shown and arranged at equi-spaced distances about the circumference of the fly-wheel disc 12. The automatic plate 26 is normally held in its declutched position by the provision of hold back springs 43, which respectively encircle the studs 28 and are compressed between one face of the automatic plate 26 and the inner face of the cover plate 29. In addition to pressing the plate 26 to declutched position, these springs also maintain the centrifugal weights 42 in non-operating position at idling speeds and thus ensure non-engagement of the clutch except under operating load conditions.

Each of these weights 42 consists of a weight head 46, a body 47 and an offset tail-piece foot lever 48, the distance between the head 46 and tail-piece 48 being such as to allow the weight to fit over the combined rim formed by the driving clutch plates 26 and 27, and the driven clutch plate 19, 23 and 24. The inner face of the flywheel disc 12 is provided with a plurality of bearing sockets 49 so spaced as to receive the respective tail-pieces 48, while studs 50 are respectively secured to the disc 12 in position to form fulcrum edges 51 for the respective weights 42. In assembled condition, each weight body 47 lies close to the rim of the cover plate structure while its tail-piece 48 rests against a face of the automatic plate 26, being so held by the position of the fulcrum stud 50. Also that portion 52 of the tail-piece 48, which engages the fulcrum edge 51, is of arcuate shape to permit the free swing of the weight 42. The initial adjustment of the hold-back springs is such that at low drive shaft speeds the centrifugal pressure of the weights 42 is insufficient to overcome the initial pressure of the hold back springs and the clutch is disengaged. However, when the motor attains the speed predetermined for the particular service in which the clutch is to operate the weight heads 46 swing outwardly to thereby rock the tail-pieces 48 in the direction to press and hold the clutch plate in clutching and power transmitting relation with the driven clutch plate parts.

The weights are so designed that the pressure exerted by them increases relatively rapidly as the speed of the drive shaft rises. Since the weights are wide, measured in a direction roughly circumferentially of the clutch facings, the effect of their shifting is distributed over relatively wide areas of the automatic plate, and since said weights are arranged at equal relatively closely spaced intervals, the distribution of pressure is substantially even causing the automatic plate to be firmly pressed toward the positive plate and discs or facings so that frictional engagement is brought about at all points, and so that any tendency of one part of the automatic plate to assume a distorted form is resisted.

It has been found that, with material including a solid lubricant and having a low variable coefficient of friction, such as above described, excellent results are obtained if the weights are designed so that the pressures applied thereby exceed the pressures holding the clutch elements of manually operated friction clutches, intended to provide a minimum of slippage, by approximately twenty-five percent or more at full engagement so that though slipping is desired at low speeds of the drive shaft, the seemingly paradoxical practice of increasing the pressure is found to present the most successfully operating and most durable clutch.

The shaft 11 is journalled at one end in a ball bearing 56 provided axially of the fly-wheel disc 12, while at the other end it is journalled in a like bearing 57 mounted in the housing 58, secured to housing end plate 29 by bolts 59.

In describing the operation of the automatic control, it will be seen from Figure 1 that the fly-wheel disc 12 is driven by the driving shaft 10 and transmits rotary movement to the automatic plate 26 through the bolts 28, and to the plate 27 through the posts 32 as well as to the weights 42 which are pivoted in the fly-wheel structure. When the engine speed reaches that necessary for running conditions, the centrifugal effort of the weights 42 overcomes the action of the springs 43 and so shifts the clutch plate 26 to the left in an axial direction as seen in Figure 1, so that it not only contacts with the friction disc 24 but causes the clutch plate 19 to also move in the same direction and thereby bring the friction disc 23 into frictional engagement with the positive plate 27. In this way, the parts of the clutch plate 19 are frictionally clamped between the plates 26 and 27 so that their motion is transmitted to drive the shaft 11. Thus the speed of the motor bears a direct relation to the clutching action transmitted by the action of the centrifugal weights 42 and yet there is not such a positive drive as requires shifting to a lower gear ratio to pick up the load so long as resistance is not greater than the maximum engine torque. So long as the resistance tends to exceed the developed torque, the decreased speed of the clutch parts will cause a slipping between the clutch plates until the engine speed is increased to the point where the engine torque will take care of the resistance and will pick up the load. It will thus be evident that the clutch provides for automatically transmitting the motion of the driving shaft to the driven shaft 11 in ratios having a direct relation to the speed of the engine and to the road resistance, the action being such that approximately ninety percent of the usual shift operations may be eliminated in motor vehicle operation in the pleasure car class.

In transmitting such motion the clutch above described, having elements provided with permanently lubricated hard smooth surfaces presenting a relatively low varying coefficient of friction and including weights designed so that at any desired speed of the engine the pressures exceed normal manually operated clutch pressures by twenty-five percent or more is capable of withstanding substantial slippage without injury until the engine shaft and driven shaft reach the speed at which the clutch should be fully engaged so that it is not essential, in using the clutch of the present invention, to utilize changes in gearing of the transmission except under extraordinary conditions. That is, the coefficient of friction between the clutch elements is such that when the engine speed is low, and the torque of the engine small, the weights are designed to permit slipping that ceases entirely when the engine shaft reaches the correct speed.

Long periods of use, or excess slippage, such as is caused by improper operation or abuse, will work out some of the graphite lubrication from the facings (23 and 24) in the form of a fine dust. Unless provision is made for the removal of this dust from the clutch and clutch housing, it will gradually collect on the facings, causing a glaze of excess graphite, so that thereafter slipping of the clutch will occur when non-slipping operation is desired, due to the presence of excess lubricant on the disc surfaces thereafter. Also while the coefficients of the clutch will remain sufficiently constant for satisfactory operation under normal conditions, the coefficients of friction decrease with temperature increases, and when highly heated undesirable slipping will occur. Accordingly to prevent excessive temperature rise that will cause too low coefficients of friction to develop, and at the same time, to remove any fine dust from housing 13 that may be removed from discs 23 and 24 in operation, ventilating holes 61 may be provided in cover plate 29 through which air is drawn into housing 13 by the centrifugal circulating action induced by the rotation of the clutch parts. This air passes outward over and between the clutch plates and parts in operation cooling the parts and forcing the dust as it develops out through ventilating openings 62 formed through the cylindrical wall of housing 13. Openings 62 it will be noted are located in the planes of discs 23 and 24 so that the dust will be completely removed in operation without being pocketed in housing 13 to fall back between the clutch plates when housing 13 is brought to rest. In this way the clutch parts are simultaneously cooled in operation, the dust is eliminated, and the characteristics held constant within practical operating limits throughout the life of the clutch.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. An automatic clutch including drive and driven shafts and having clutch elements arranged for frictional engagement, interconnecting said shafts, and means to automatically apply increased pressure to said elements as the speed of rotation of the driving shaft increases, said clutch elements having the characteristic of presenting a coefficient of friction that is relatively low at low pressures and that increases as the pressures increase.

2. In a clutch and power transmitting mechanism, a driving member; a driven member; frictional elements associated with said members and adapted to transmit torque therebetween when forced together into frictional engagement; means for automatically forcing said elements together into frictional engagement and for causing pressure between the same to build up as the speed of rotation of said driving member increases; said clutch elements having the characteristic of presenting a coefficient of friction that is relatively low at low pressures and that increases as the pressures increase.

3. An automatic clutch including drive and driven shafts and having clutch elements arranged for frictional engagement inter-connecting said shafts, and means to automatically apply increased pressure to said elements, said clutch elements having the characteristic of presenting a coefficient of friction that is relatively low at low pressures and that increases as the pressures increase.

4. In a power delivering organization, an automatic clutch adapted to provide a power transmitting connection between a load and a prime mover of the type whose torque output increases substantially in accordance with increase in the speed thereof, said automatic clutch comprising driving and driven members, means mounting said members for engagement and disengagement, said members being operable to transmit power between said prime mover and load when they are engaged; means for automatically forcing said members into frictional engagement when said prime mover attains a predetermined speed, and for causing pressure to build up therebetween as said prime mover is accelerated throughout a speed range having said predetermined speed as its lower limit; means associated with said members for causing said members to smoothly slip and transmit power from said prime mover to said load through a slipping drive throughout the major portion of said speed range, to thereby allow said prime mover to operate at a higher torque delivery speed, said means comprising a substantial quantity of lubricant uniformly disseminated throughout the body of one of said members and imparting the characteristic to the member of presenting a coefficient of friction that is relatively low at low pressures and that increases as the pressures increase.

5. The organization that is claimed in claim 4, wherein the member throughout which said lubricant is disseminated has a coefficient of friction substantially less than 0.3.

6. In an automatic clutch, contacting clutch elements, at least one of said elements being formed of a material which embodies at least approximately twenty percent of a solid lubricant uniformly distributed therethrough in the original mix, said element having the characteristic of presenting a coefficient of friction that is relatively low at low pressures and that increases as the pressures increase.

7. In an automatic clutch, clutch elements having surfaces adapted to be brought into frictional engagement under varying degrees of pressure, at least one of said elements being formed of a material having a coefficient of friction of less than 0.3, and having the characteristic of presenting a coefficient of friction that is relatively low at low pressures and that increases substantially uniformly as the pressures increase.

CHAS. B. HEINRICH.